US008050923B2

(12) United States Patent
Blair

(10) Patent No.: US 8,050,923 B2
(45) Date of Patent: Nov. 1, 2011

(54) AUTOMATED UTTERANCE SEARCH

(75) Inventor: Christopher D. Blair, South Chailey (GB)

(73) Assignee: Verint Americas, Inc., Roswell, GA (US)

( * ) Notice: Subject to any disclaimer, the term of this patent is extended or adjusted under 35 U.S.C. 154(b) by 1008 days.

(21) Appl. No.: 11/616,490

(22) Filed: Dec. 27, 2006

(65) Prior Publication Data

US 2008/0082341 A1 Apr. 3, 2008

Related U.S. Application Data

(60) Provisional application No. 60/827,514, filed on Sep. 29, 2006.

(51) Int. Cl.
*G10L 15/00* (2006.01)

(52) U.S. Cl. ...................... 704/251; 704/235; 379/88.13

(58) Field of Classification Search .................. 704/251, 704/235; 379/88.13
See application file for complete search history.

(56) References Cited

U.S. PATENT DOCUMENTS

| | | | | |
|---|---|---|---|---|
| 6,278,772 | B1 * | 8/2001 | Bowater et al. | 379/88.13 |
| 6,411,724 | B1 * | 6/2002 | Vaithilingam et al. | 382/100 |
| 6,697,796 | B2 * | 2/2004 | Kermani | 707/3 |
| 7,058,652 | B2 * | 6/2006 | Czarnecki et al. | 1/1 |
| 7,457,404 | B1 * | 11/2008 | Hession et al. | 379/265.07 |
| 2002/0019737 | A1 * | 2/2002 | Stuart et al. | 704/275 |
| 2004/0083101 | A1 * | 4/2004 | Brown et al. | 704/235 |
| 2009/0306984 | A1 * | 12/2009 | Mark et al. | 704/257 |

* cited by examiner

*Primary Examiner* — Daniel D Abebe
(74) *Attorney, Agent, or Firm* — McKeon, Meunier, Carlin & Curfman, LLC

(57) ABSTRACT

A speech analyzer is integrated or otherwise coupled to an audio player. The speech analyzer is used to identify recorded communication sessions in accordance with a search criterion. A search criterion may be spoken or otherwise communicated to the speech analyzer. Results generated by the speech analyzer are converted into visual information that is presented to a user of the speech analyzer. Results generated by the speech analyzer can be cached for real-time user review while the speech analyzer processes additional stored conversations.

22 Claims, 6 Drawing Sheets

AUTOMATED UTTERANCE SEARCH

CROSS REFERENCE TO RELATED APPLICATION

This application claims priority to copending U.S. Provisional Patent Application entitled, "Automated Utterance Search," having application Ser. No. 60/827,514, filed Sep. 29, 2006, which is incorporated herein by reference in its entirety.

BACKGROUND

It is desirable in many situations to record voice communications, such as telephone calls. This is particularly so in a contact center environment in which many agents may be handling hundreds of telephone calls each day. Recording of these telephone calls can allow for quality assessment of agents, improvement of agent skills, dispute resolution, and can provide additional benefits.

Recording systems that record telephone calls and allow users of the systems to search for specified calls based on one or more call attributes are well known. Generally, recordings matching a set of criteria are displayed for a user to review details of the calls and as a guide in selecting calls that they wish to replay. When searching for a particular utterance within a call, the user will listen to the replay of the call until they hear the particular utterance-of-interest.

In many cases, a user is asked to retrieve a recording related to a specified event. For example, a contact center reviewer may be asked to identify whether a contact center employee or a customer said something during a call or calls. Often the precise details of which call or calls is required are insufficient to identify a single call from the set of all recorded calls. Consequently, a number of calls must be reviewed manually to identify the required call or calls. In very few cases, the user will recall or otherwise know when within a call the event/utterance-of-interest occurred. Typically, the user has to review the call by replaying the recording from beginning to end at the rate the call was recorded or by fast-forwarding to pass over portions of the call to home in on the portion of the call where the utterance-of-interest occurred.

The most time consuming case occurs when the user is trying to prove that an utterance-of-interest was not said. When faced with this scenario, the user is forced to listen to all of the identified calls (i.e., the calls that met the initial search criteria). Such searches are time consuming and prone to error. Especially when the initial search criteria are insufficient to identify a set of calls with a manageable number of calls and many hours of recordings have to be reviewed.

Thus, a heretofore unaddressed need exists in the industry to address the aforementioned deficiencies and inadequacies.

SUMMARY

A speech analyzer is integrated or otherwise coupled to an audio player. The speech analyzer uses a search criterion to identify recorded conversations that include an utterance-of-interest. A search criterion may be spoken or otherwise communicated to the speech analyzer. Results generated by the speech analyzer are converted into visual information that is presented to a user of the audio player. Results generated by the speech analyzer can be cached for real-time review while the speech analyzer processes additional stored conversations.

An embodiment of a system for analyzing voice-based communication sessions comprises a player, an analysis engine and a presenter. The player reproduces stored communication sessions. The analysis engine receives and analyzes the stored communication sessions to generate a result responsive to the presence of an utterance-of-interest in the stored communication sessions. The presenter is coupled to the analysis engine. The presenter receives and presents a representation of the result.

An embodiment of a method for enhancing an audio player comprises the steps of integrating a speech analysis engine with the audio player, using the speech analysis engine to identify an occurrence of an utterance-of-interest within a recorded communication session in response to a search criterion to generate a result and converting the result into a visual representation.

An embodiment of a method for analyzing a communication session comprises the steps of integrating a speech analysis engine with a recorder/player, using the recorder/player to record a set of communication sessions, identifying a subset of the set of communication sessions to analyze, communicating a search criterion indicative of an utterance-of-interest to the speech analysis engine, using the player portion of the recorder/player to communicate each member of the subset of communication sessions to the speech analysis engine and using the speech analysis engine to identify the presence of the utterance-of-interest in a member of the subset of communication sessions.

Other systems, devices, methods, features and advantages will be or will become apparent to one skilled in the art upon examination of the following figures and detailed description. All such additional systems, devices, methods, features and advantages are defined and protected by the accompanying claims.

BRIEF DESCRIPTION OF THE DRAWINGS

The present systems for analyzing voice-based communication sessions and methods for enhancing an audio player and analyzing a communication session, as defined in the claims, can be better understood with reference to the following drawings. The components within the drawings are not necessarily to scale relative to each other; emphasis instead is placed upon clearly illustrating the principles involved in analyzing recorded conversations and enhancing an audio player.

DETAILED DESCRIPTION

Figure 1:
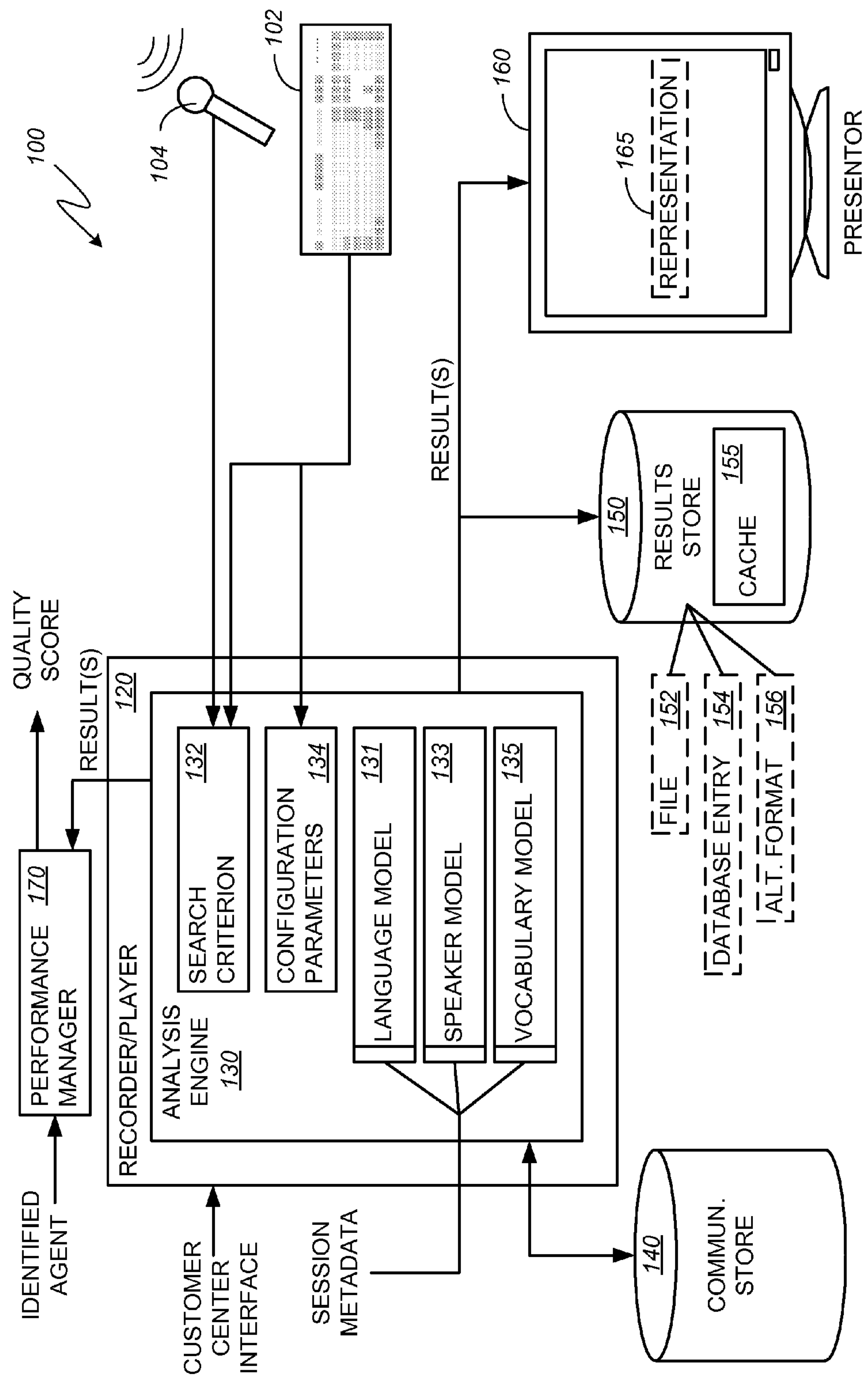
FIG. 1 is a schematic diagram illustrating an embodiment of a system for analyzing recorded communication sessions.

A player is coupled or otherwise integrated with an analysis engine. The player reproduces a recorded communication session. The analysis engine identifies matches between a specified utterance-of-interest and audio information from a previously recorded communication session. The utterance-of-interest is a phoneme, word, or a phrase.

The speech analysis system is capable of retrieving and processing any number of recordings. A user of a speech analysis system that includes the above-referenced components can request an analysis of all or a select set of recorded communication sessions. The speech analysis system analyzes select recordings and generates results that identify which recorded communication sessions include the utterance-of-interest. Select recordings are identified via one or more search criteria communicated to the speech analysis system. Select recordings are processed by the analysis engine. The analysis engine generates results that include an indication of the presence or absence of the utterance-of-interest in the select recording, as well as the location or locations within the recording where the utterance-of-interest can be found and an indicator responsive to the certainty that the audio information is an accurate match with the utterance-of interest. The analysis engine can be directed to identify matches with multiple phonemes, words or phrases in any combination. When directed to identify matches multiple utterances-of-interest, results will include information responsive to each occurrence of each utterance-of-interest.

Optionally, audio information may be processed in advance of the user selecting specific calls for analysis. The pre-processing of audio recordings of calls to generate a phonetic representation or a transcript of a larger set of calls, will result in significantly reduced processing times once the user identifies communication sessions to be analyzed.

Output generated by the analysis engine is stored in a results store regardless of whether the speech analysis system is performing a real-time analysis of an audio recording or analyzing a phonetic representation or a transcript. The results store contains an accessible cache of the results generated upon completion of the analysis of each recording. Consequently, a user of the speech analysis system may choose to wait for all selected recordings to be analyzed or otherwise processed by the analysis engine. Alternatively, the user may start performing directed searches on the subset of recordings already processed. In the latter case, results from searches performed to date may be automatically reapplied to each recorded communication or as the session (e.g., a call) is processed in near real-time without having to wait for the entire communication session to be processed. By storing intermediate results in an accessible cache, an index or transcript can be observed when a previously analyzed session is the subject of a subsequent search by this or another user. Thus, the user may not be forced to wait until the recorded communication session is analyzed again.

Accordingly, the speech analysis system dramatically speeds up a search and retrieval process when the presence of specific utterances is sought in a set of recorded communication sessions.

Embodiments of the present systems and methods as illustrated in the accompanying drawings and described below include a player that is integrated with a recorder. It should be understood that the source of the recorded communication session is not limited to an integrated recorder/player.

FIG. 1 is a schematic diagram illustrating an embodiment of a speech analysis system 100 for analyzing recorded voice-based communication sessions. The speech analysis system 100 includes recorder/player 120, which is communicatively coupled to communication store 140, results store 150, presenter 160 and performance manager 170. Recorder/player 120 receives a series of voice communications (e.g., customer-center calls) from a customer-center interface. Recorder/player 120 records the communication sessions and stores information regarding each of the sessions in communication store 140. Analysis engine 130 receives a spoken search criterion via microphone 104. Analysis engine 130 further receives search criterion 132 and configuration parameters 134 via keyboard 102 or some other input device configured to communicate information to analysis engine 130. Search criterion 132 identifies a phoneme, word or phrase that the analysis engine 130 uses as a key to identify matching utterances in the recordings stored within communication store 140. In alternative embodiments, a user of the speech analysis system 100 may search for phonemes, words or phrases, in any combination including exact phrases, and/or sets of phonemes, words, or phrases that are uttered within a set period of time. When search criteria include a combination, the combination may be nested, logically combined and/or related in time. For example, "A" within N seconds of "B."

In the illustrated embodiment, recorder/player 120 receives audio information via a customer-center interface. A customer center coupled to the interface may include, but is not limited to, outsourced contact centers, outsourced customer relationship management, customer relationship management, voice of the customer, customer interaction, contact center, multi-media contact center, remote office, distributed enterprise, work-at-home agents, remote agents, branch office, back office, performance optimization, workforce optimization, hosted contact centers, and speech analytics, for example. A customer-center interface is an example of an audio communication session information source that can be used to populate a store of communication session recordings. Other sources of communication sessions can be processed by the present systems and methods.

When the audio recordings stored in communications store 140 are recorded in stereo (i.e., when separate channels are used to record each party to a conversation), searches can be directed against either party or a specified party (e.g., a customer-center agent or customer) having said the utterance-of-interest.

When directed to analyze a set of recorded communication sessions, analysis engine 130 applies metadata identifying characteristics of the speakers responsible for the recorded audio information as applied to one or more speech analyzers (not shown) to generate results. For example, where the identity of the speaker is known, a speaker dependent language model may be applied; similarly, if the country, city or other geographic region from which the customer is calling is known, an appropriate language model may be applied. Results—identifying the location of matches within the particular communication session as well as an indication of the certainty that each identified match is an actual match of the utterance-of-interest—are forwarded to results store 150, where they are stored in cache 155 as they are being received. Stored results may be arranged in multiple storage formats. In the illustrated embodiment, stored results are arranged as files 152, database entries 154 and in alternative formats 156, where alternative formats are separate and distinct from the file format 152 and database entries 154. In this way, received results can be reviewed or otherwise analyzed by one or more suitably configured computing devices coupled to results store 150, while analysis engine 130 continues to analyze additional recordings.

As illustrated in FIG. 1, results generated by analysis engine 130 are forwarded to a first suitably configured computing device labeled presenter 160. Presentor 160 receives and converts results generated by analysis engine 130 into representation 165. In the illustrated embodiment, representation 165 is a graphical depiction presented on a monitor. It should be understood that presenter 160 can produce representations suitable for reproduction via printers and plotters as well as speakers (i.e., audio) and in other formats. Moreover, various representations 165 responsive to the analysis engine 130 generated results and the recorded communication sessions can be stored and cataloged for future review and additional analysis.

As also shown in FIG. 1, results generated by analysis engine 130 are forwarded to performance manager 170. Performance manager 170 is a hardware device that generates a quality score as a function of the received results and an identified agent, such as a customer-center agent.

In the illustrated embodiment, communication store 140 and results store 150 are separate data stores. When voice communication sessions are recorded and stored in a digital format, communication store 140 and results store 150 may be integrated or otherwise consolidated in a central set of one or more data storage devices.

It should be further understood that the present speech analysis system 100 is not limited to single physical devices, that is, in alternative embodiments one or more of communication store 140, results store 150, presenter 160, recorder/player 120 and analysis engine 130 can be duplicated as may be required to permit multiple users to analyze recorded communication sessions simultaneously. Moreover, one or more of communication store 140 and results store 150 may comprise multiple physical devices distributed across multiple locations.

Figure 2:
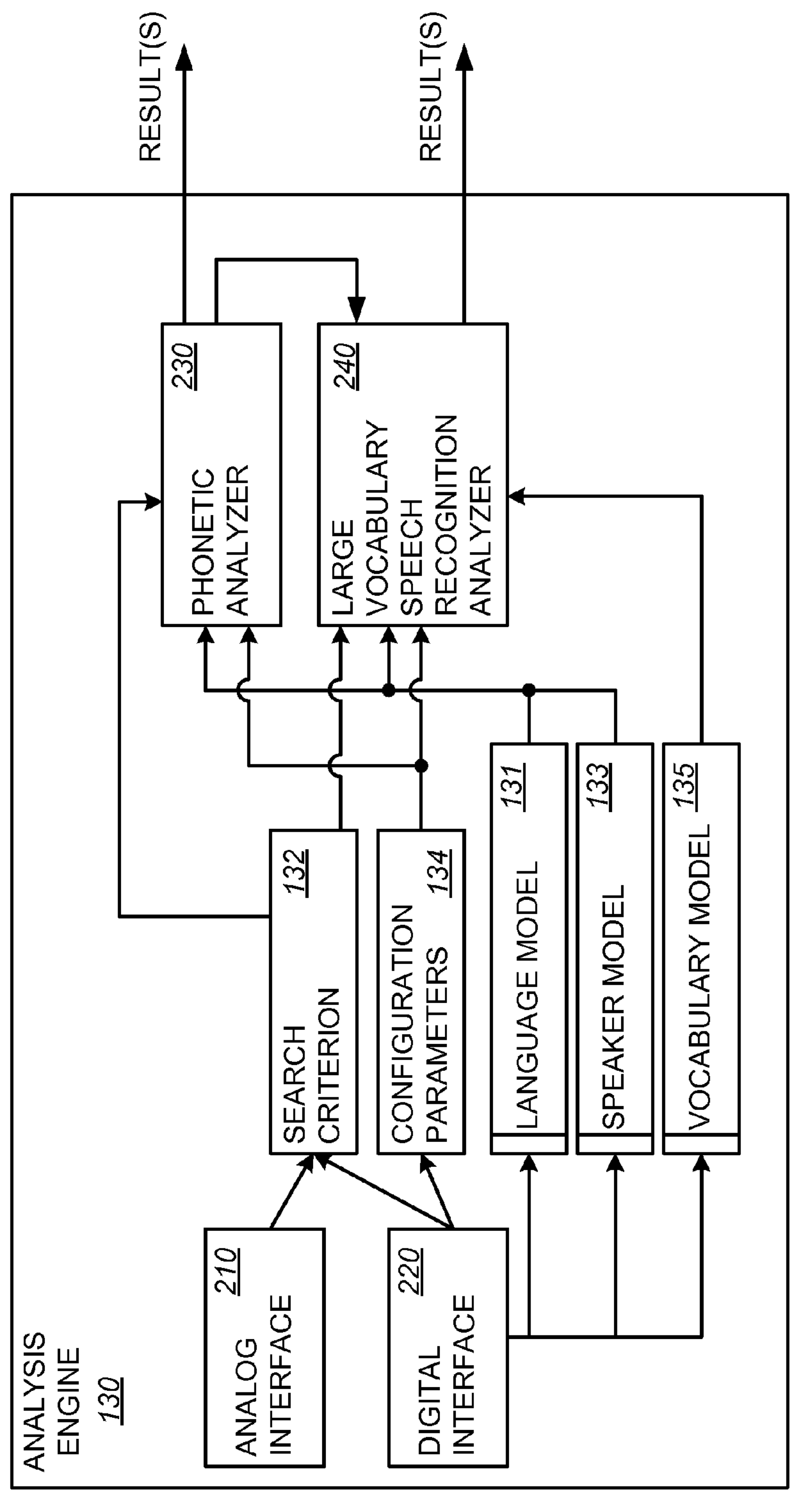
FIG. 2 is a functional block diagram illustrating an embodiment of the analysis engine of FIG. 1.

FIG. 2 is a functional block diagram illustrating an embodiment of the analysis engine 130 of FIG. 1. Analysis engine 130 receives spoken information (e.g., an utterance-of-interest) via analog interface 210, which forwards the utterance-of-interest to search criterion 132. Spoken information provided as an input to analysis engine 130 is applied to the same internal models that are used to analyze the recorded communication session or sessions when the user was a party involved in the recorded communication session(s). Otherwise, when the user was not a party to the recorded communication session(s), spoken information provided as an input to analysis engine 130 is applied to different internal models than those that are used to analyze recorded communication sessions. For example, a dialect spoken a specified city or region may result in a difference between the spoken input provided by a supervisor that is located in a different city or region than an agent recorded in the communication session. This may be true even when the supervisor and the agent reside in the same country and speak the same language. Similar differences in the internal models may be necessary across political (i.e., separate countries) or other geographic boundaries. Regardless of the models applied to both the spoken input information and the recorded communication session, input information can be presented to the user so that the user can confirm that the utterance-of-interest (e.g., phoneme, word, phrase or combinations of any of the above) reflect the intention of the user.

Analysis engine 130 further receives text and information in other digital formats via digital interface 220. Analysis engine 130 forwards or otherwise stores received digital information such as search criterion 132 and configuration parameters 134. Moreover, analysis engine 130 receives and forwards metadata to one or more of language model 131, speaker model 133 and vocabulary model 135 to refine or otherwise adjust the respective models to an identified language, speaker, dialect, etc. Search criterion 132, configuration parameters 134 and one or more of the modified or unmodified language model 131, speaker model 133 and vocabulary model 135 are applied to phonetic analyzer 230 and/or large vocabulary speech recognition analyzer 240 to identify when a recorded communication session contains one or more instances of an utterance-of-interest.

As illustrated in FIG. 2, results from phonetic analyzer may be forwarded to large vocabulary speech recognition analyzer 240 to improve the effectiveness of analysis engine 130 in accurately identifying recordings that contain the utterance-of-interest. Results generated by analysis engine 130 may include metadata identifying various characteristics of the recorded voice communication session as well as other information associated with an identified (i.e., a probable) match. Metadata may include information identifying speaker(s), time, language(s), location(s), the hardware and configuration parameters used to record the communication session, etc. In addition to the above described metadata and audio data, results generated by analysis engine 130 may include annotation information such as indices or markers useful for presenting the results to a user of the speech analysis system 100 (FIG. 1).

It should be understood that analysis engine 130 can receive multiple search criteria (e.g., a set of phonemes, words and/or phrases) that together identify search criteria that are applied to one or both of phonetic analyzer 230 and large vocabulary speech recognition analyzer 240. When multiple phonemes, words, and/or phrases are identified as search keys, analysis engine 130 will generate varying indices, markers or other information in a stream of results.

In operation, the analysis engine 130 of FIG. 2 performs various functions. These functions include delineating an audio component of a voice communication session into fragments or segments. Each of the fragments is attributable to a party of the communication session and represents a contiguous period of time during which that party was speaking. By way of example, one such fragment could involve a recording (e.g., 4 seconds in duration) of the speech of an agent during a communication session with customer, in which the agent greeted the customer.

In some embodiments, the parties to a communication session are recorded separately. In other embodiments, a communication session can be recorded in stereo, with one channel for the customer and one for the agent. In yet further embodiments, the parties to the communication session are recorded as a single “mixed” channel.

A vox detection analyzer is used to determine when each party is talking. Such an analyzer typically detects an audio level above a pre-determined threshold for a sustained period (i.e., the “vox turn-on time”). Absence of speech is then determined by the audio level being below a pre-determined level (which may be different from the first level) for a pre-determined time (which may be different from the previous “turn-on” time). Portions of a raw or real-time audio recording of a communication session where the absence of speech is detected can be dropped or otherwise edited to conserve data storage resources. Moreover, identifying the presence of speech information on each of the two channels of a recorded session enables the identification of who, if anyone, is speaking at any given time.

Once audio presence is determined, the communication session (e.g., a customer-center generated call) can be broken into “fragments” or “segments” representing the period in which each party speaks during the communication session. In this regard, a fragment can be delimited by one or more of the following: i) the start or end of the session; ii) the other party starting to speak and the silence of a previous speaking party; iii) a “significant” pause—a period greater than a typical interval between one party finishing speaking and the other party beginning to speak. This interval may be predetermined or determined by examining the actual intervals between the parties speaking during any particular communication session. If the session involves more than a few alternations of which party is speaking, these alternations can typically be grouped. For instance, one group could be "normal turns of dialog" in which the intervals are on the order of a fraction of a second to one or two seconds and another group could be "delays" in which the dialog is hesitant or significantly delayed for some reason; and iv) a "significant interruption"—a period during which both parties are speaking and which is longer than typical confirmatory feedback (e.g., the utterance "uh-huh") that is intermittently spoken during a conversation.

Figure 3:
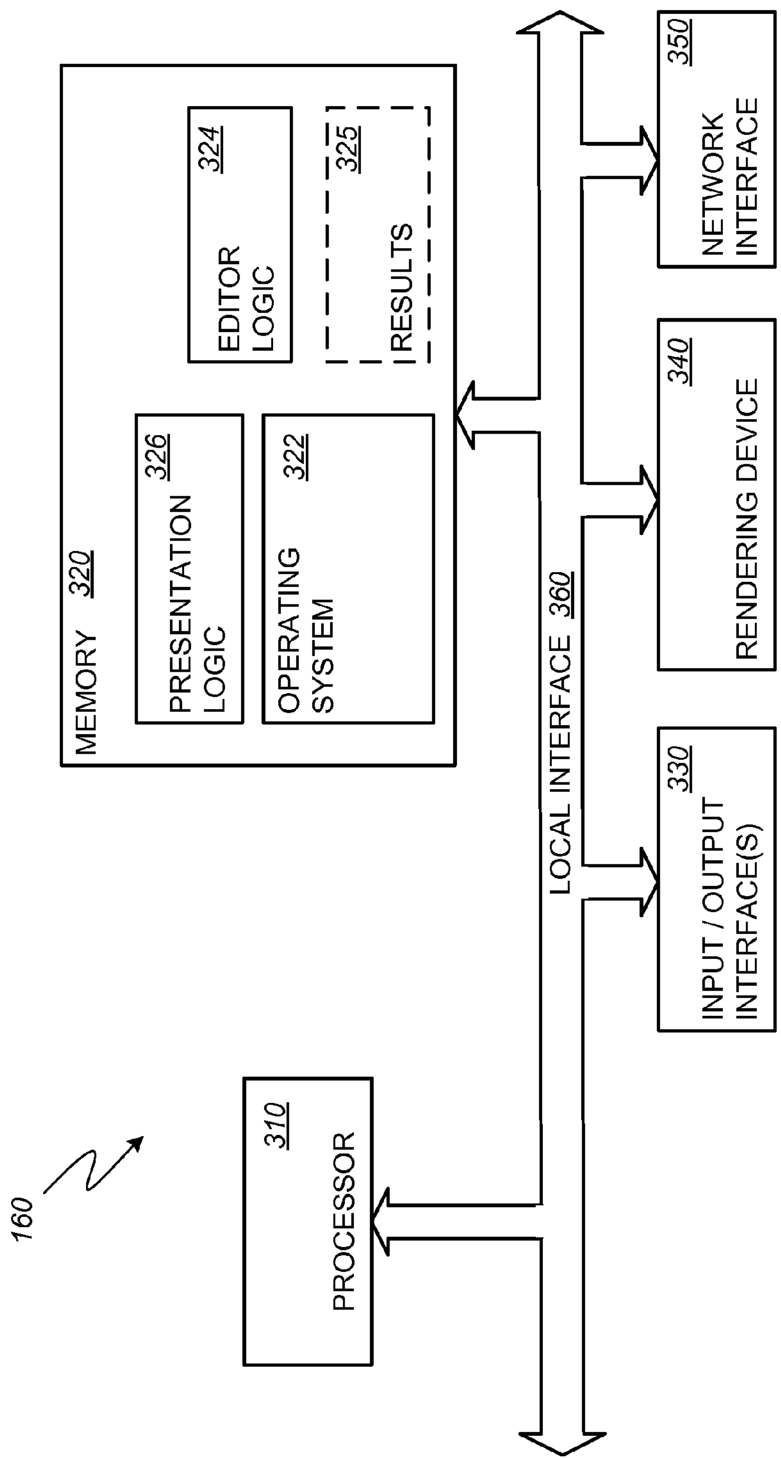
FIG. 3 is a functional block diagram illustrating an embodiment of the presenter of FIG. 1.

FIG. 3 is a functional block diagram illustrating an embodiment of the presenter 160 of FIG. 1. Generally, in terms of hardware architecture, as shown in FIG. 3, presenter 160 is a general purpose computing device or other hardware device that includes processor 310, memory 320, input/output (I/O) interface(s) 330 and network interface 350. Processor 310, memory 320, I/O interface(s) 330, rendering device 340 and network interface 350 are communicatively coupled via local interface 360. The local interface 360 can be, for example but not limited to, one or more buses or other wired or wireless connections, as is known in the art. The local interface 360 may have additional elements, which are omitted for simplicity, such as controllers, buffers (caches), drivers, repeaters, and receivers, to enable communications. Further, the local interface 360 may include address, control, power and/or data connections to enable appropriate communications among the aforementioned components. Moreover, local interface 360 provides power to each of the processor 310, memory 320, I/O interface(s) 330, rendering device 340 and network interface 350 in a manner understood by one of ordinary skill in the art.

Processor 310 is a hardware device for executing software, particularly that stored in memory 320. The processor 310 can be any custom made or commercially available processor, a central processing unit (CPU), an auxiliary processor among several processors associated with presenter 160, a semiconductor based microprocessor (in the form of a microchip or chip set), or generally any device for executing software instructions.

Memory 320 can include any one or combination of volatile memory elements (e.g., random-access memory (RAM), such as dynamic random-access memory (DRAM), static random-access memory (SRAM), synchronous dynamic random-access memory (SDRAM), etc.) and nonvolatile memory elements (e.g., read-only memory (ROM), hard drive, tape, compact disk read-only memory (CD-ROM), etc.). Moreover, the memory 320 may incorporate electronic, magnetic, optical, and/or other types of storage media. Note that the memory 320 can have a distributed architecture, where various components are situated remote from one another, but can be accessed by the processor 310.

The software in memory 320 may include one or more separate programs, each of which comprises an ordered listing of executable instructions for implementing logical functions. In the example embodiment illustrated in FIG. 3, the software in the memory 320 includes operating system 322, editor logic 324 and presentation logic 326. The operating system 322 essentially controls the execution of other computer programs and provides scheduling, input-output control, file and data management, memory management, communication control and related services.

Editor logic 324 includes one or more programs and one or more data elements that enable an operator of presenter 160 to update various input/output configuration parameters to search and review or otherwise observe analysis engine generated results. Editor logic 324 may include one or buffers and parameter stores for holding configuration information and or data as may be required to interface with any number of printers and display devices that may be coupled to presenter 160.

Presentation logic 328 includes one or more programs and one or more data elements that enable presenter 160 to generate, store and communicate data from results store 150 and recorder/player 120. Presentation logic 328 may include one or more buffers and parameter stores for holding configuration information and or data as may be required to interface with any number of printers and display devices that may be coupled to presenter 160.

Editor logic 324 and presentation logic 326 are source programs, executable programs (object code), scripts, or other entities that include a set of instructions to be performed. When implemented as source programs, the programs are translated via a compiler, assembler, interpreter, or the like, which may or may not be included within memory 320, to operate properly in connection with O/S 322.

I/O interface(s) 330 includes multiple mechanisms configured to transmit and receive information via presenter 160. These mechanisms support human-to-machine (e.g., a keyboard) and machine-to-human information transfers. Such human-to-machine interfaces may include touch sensitive displays or the combination of a graphical-user interface and a controllable pointing device such as a mouse. Moreover, these mechanisms can include voice activated interfaces that use a microphone or other transducer.

Rendering device 340 enables presenter 160 to communicate information with various network coupled display devices such as printers, plotters, monitors, etc. Rendering device 340 is a hardware device that is responsible for producing graphical abstractions in accordance with one or more programs and data. Rendering device 340 receives instructions and data from processor 310 and memory 320 and generates one or more output signals suitable for directing the presentation of information via a designated output device.

Network interface 350 enables presenter 160 to communicate with various network-coupled devices, including results store 150 (FIG. 1). Network interface 350 performs a variety of functions including, for example the signal conditioning and format conversions to communicate data through speech analysis system 100. Preferably, network interface 350 is compatible with one or both of the Gigabit Ethernet standards (i.e., IEEE 802.3z Fiber Optic Gigabit Ethernet and IEEE 802.3ab Twisted-Pair Gigabit Ethernet) and the TCP/IP protocol. It should be understood that other data-network interfaces compatible with other network protocols including wireless protocols may also be used.

When presenter 160 is in operation, the processor 310 is configured to execute software stored within the memory 320, to communicate data to and from the memory 320, and to control operations of the presenter 160 pursuant to the software. The editor logic 324, presentation logic 326, and the O/S 322, in whole or in part, but typically the latter, are read by the processor 310, perhaps buffered within the processor 310, and then executed.

When editor logic 324, presentation logic 326 and results 325 are implemented in a memory, as is shown in FIG. 3, it should be noted that these software and data elements can be stored on any computer-readable medium for use by or in connection with any computer related system or method. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a RAM (electronic), a ROM (electronic), an erasable programmable read-only memory (EPROM), an electrically erasable programmable read-only memory (EEPROM), or Flash memory) (electronic), an optical fiber (optical), and a CDROM (optical). Note that the computer-readable medium could even be paper or another suitable medium upon which the program is printed, as the program can be electronically captured, via for example optical scanning of the paper or other medium, then compiled, interpreted or otherwise processed in a suitable manner if necessary, and then stored in a computer memory.

In an alternative embodiment, where one or more of the editor logic 324, presentation logic 326 and results 325 are implemented in hardware, the editor logic 324, presentation logic 326 and results 325 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array (s) (PGA), a field-programmable gate array (FPGA), flip-flops, etc.

Figure 4:
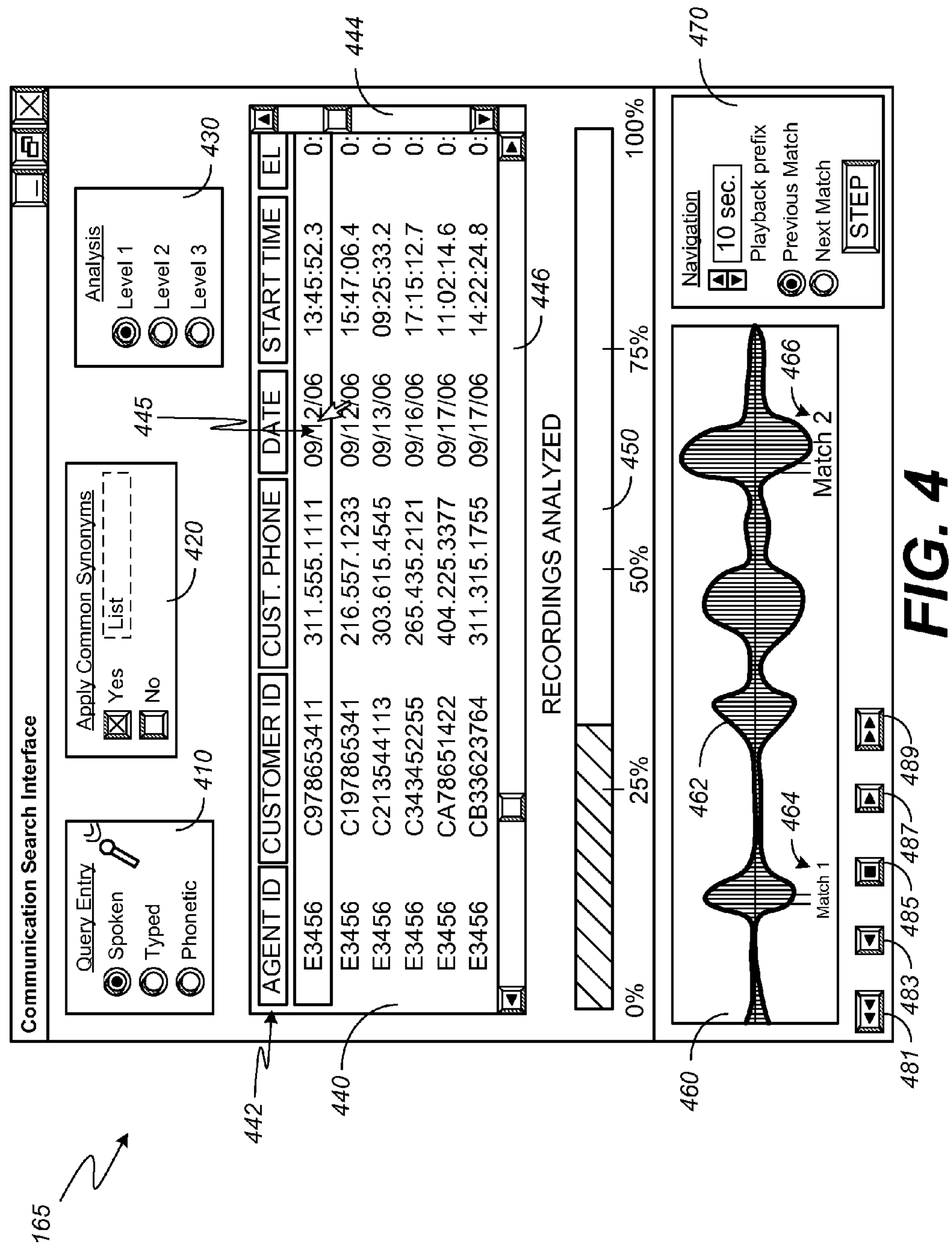
FIG. 4 is a schematic diagram illustrating an embodiment of the representation generated by the presenter of FIG. 1.

FIG. 4 is a schematic diagram illustrating an embodiment of the representation 165 of FIG. 1. In the illustrated embodiment, representation 165 is a graphical user interface that includes a number of input/output features to enable user interaction with analysis engine 130. For example, representation 165 includes query entry panel 410 that enables a user of the speech analysis system 100 to select a search criteria input format from the group of spoken, typed, or phonetic. Query entry panel 410 includes a pushbutton to indicate a present input format selection. Representation 165 further includes entry panel 420 that enables a user to choose whether to configure analysis engine 130 to look for matches to synonyms of the search criterion. Entry panel 420 includes a first and a second checkbox (labeled "yes" and "no," respectively) for identifying whether synonym searches are to be performed. When the checkbox labeled "yes" is selected, a data entry field including a list of synonyms is presented. One or more data entry interfaces such as keyboard, a mouse, a microphone, etc. can be used to add, delete or modify the list of synonyms. Representation 165 also includes entry panel 430, which enables a user to select one of multiple levels of analysis to implement when performing the search. Entry panel 430 includes respective pushbuttons associated with each of a number of levels. For example, level 1 identifies a deep analysis of the recorded communication without consideration of the processing time required to complete the analysis. A level 2 analysis includes a balanced approach that provides a quicker result at the expense of accuracy. A level 3 approach identifies a configuration that performs the fastest analysis of the recorded communication without consideration of accuracy.

Representation 165 further includes a host of fields configured to present analysis engine results to a user of the speech analysis system 100. For example, field 450 includes a horizontal depiction of the current progress of the analysis engine through the set of identified recordings to process. Output field 440 includes text fields associated with processed recordings that include a probable match with the utterance-of-interest. Output field 440 is associated with vertical scroll bar 444 and horizontal scroll bar 446 for observing the text fields. In the illustrated example, the recorded verbal communications are customer-center generated calls to customers. Each identified communication session with a probable match is represented by a horizontally arranged record. Records include fields associated with an agent identifier, a customer identifier, a customer phone number, date, start time and elapsed time of the recording. Additional fields may include a number of probable hits in the recording, the highest certainty or confidence score of any of these hits and/or a visual representation of the same.

A user of the speech analysis system 100 can select a particular recording for review by positioning selection bar 445 over a record-of-interest and entering a select input. In response to the user's selection of a particular record-of-interest, field 460 and related input controls are presented in the graphical user interface. For example, a portion of the presently selected recording is presented in the form of an audio energy envelope 462. The audio energy envelope 462 is further annotated with a first location label 464 and a second location label 466 indicative of probable matches with the search criterion at the location in the audio energy envelope where the utterance-of-interest occurs in the analyzed recording. The second location label 466 has at least one characteristic that varies as a function of a confidence level that the identified location in the recording includes the utterance-of-interest. In the example embodiment, the second location label 466 is illustrated in a larger font that that used to illustrate first location label 464. Here, the larger font is indicative of a higher confidence level that the second match location includes the utterance-of-interest than the confidence level associated with the utterance co-located with the first location label 464. When multiple words/phrases are being searched for, probable matches may be color coded to identify the respective locations of distinct words/phrases in the audio energy envelope 462.

Playback panel 470 includes multiple controls that can be manipulated by a user of speech analysis system 100. For example, pushbuttons labeled with upward and downward facing arrows may be selected to select one of a number of pre-set prefix intervals. A prefix interval is a select period of time that is used to position the player in the real-time playback of the stored verbal communication. When the playback prefix is set to 10 seconds, the playback function will use an index associated with the recording of the verbal communication to set the playback mechanism to "play" 10 seconds of recorded audio prior to the location where the probable match to the utterance-of-interest occurs in the recording. Preset or default prefix intervals can include the set of 1, 2, 5, 10 (seconds) or other periods of time as desired. Moreover, playback panel 470 may be coupled to an editor that enables a user of the speech analysis system 100 to set a prefix interval that differs from the members of the default set. Playback panel 470 further includes multiple indicators associated with respective functions that step the playback mechanism to one of a previous match and a next match. The playback mechanism is moved to the next indexed position in the recording as indicated by the selected indicator, when a user of the speech analysis system 100 selects the pushbutton labeled "Step."

Representation 165 further includes a set of playback controls. The playback controls include, fast reverse selector 481, reverse selector 483, stop selector 485, play selector 487 and fast forward selector 489. These playback controls can be used in addition to the controls provided in playback panel 470 to navigate through the present recorded verbal communication.

Figure 5:
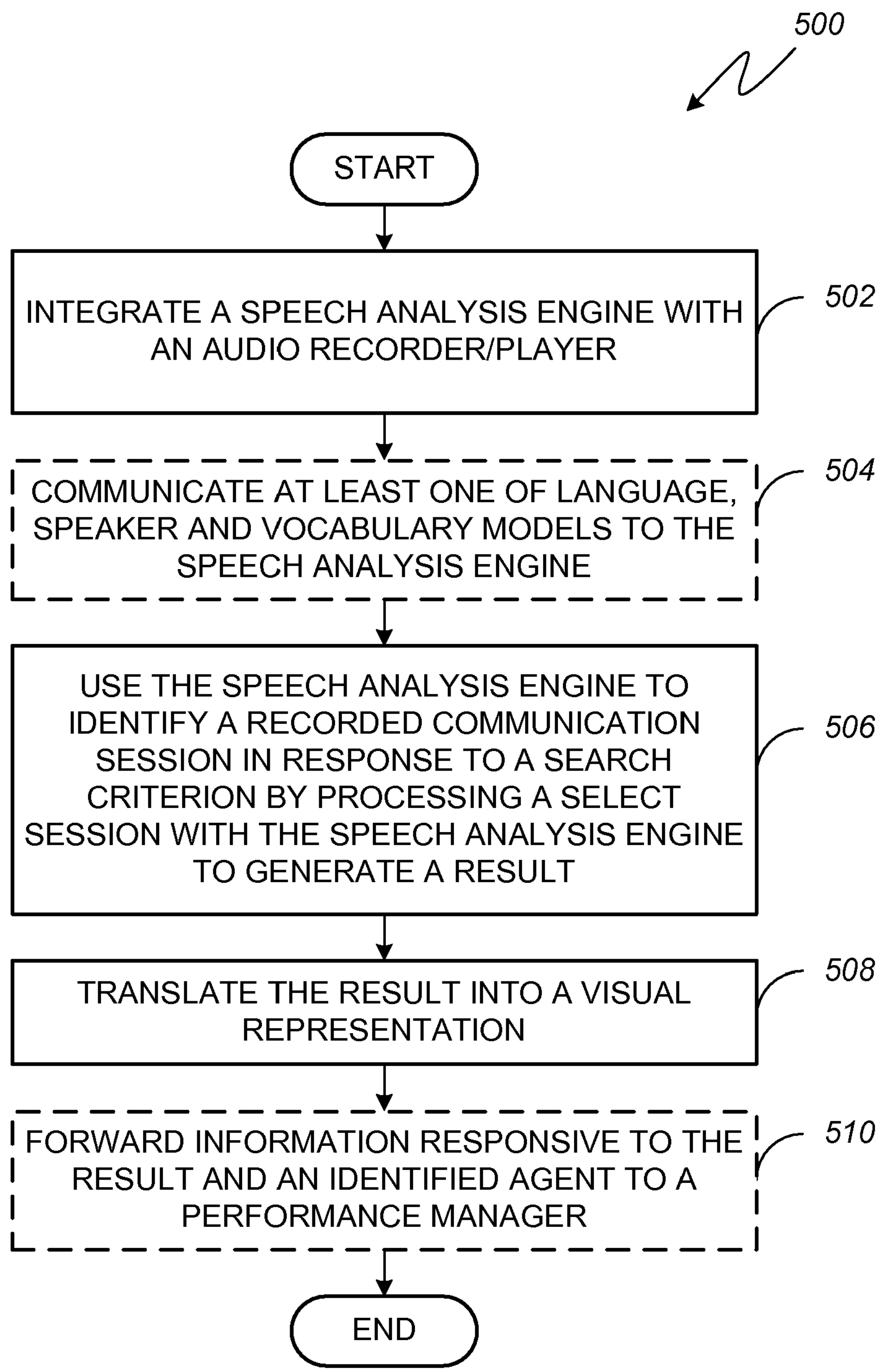
FIG. 5 is flow diagram illustrating an embodiment of a method for enhancing an audio player.

FIG. 5 is flow diagram illustrating an embodiment of a method 500 for enhancing an audio player. Method 500 begins with block 502 where a speech analysis engine is integrated or otherwise coupled to an audio player. In block 506, the speech analysis engine generates a result responsive to a select communication session and a search criterion. Thereafter, in block 508 the result is translated in to a visual representation. The flow diagram of FIG. 5 includes optional steps illustrated with dashed lines. For example, in block 504, which is inserted between blocks 502 and 506, at least one of language, speaker and vocabulary models are communicated to the speech analysis engine. By way of further example, in block 510, information responsive to the result and an identified agent are forwarded to a performance manager for compilation and additional analysis.

As explained above, metadata concerning each separate communication session can be forwarded to one or more of the language, speaker and vocabulary models to adjust the speech analysis engine. In some embodiments, a user of the system directs the analysis engine to use specific language, speaker and vocabulary models. In alternative embodiments, the system uses metadata describing the communication session such as agent and customer identifiers when the communication is a communication session connected through a customer center. The agent and customer identifiers and perhaps other information can be used to refine the speech analysis engine in real time when metadata identifies the speaker. Generally, a speech analysis engine is trained or otherwise optimized to a cross-section of speakers from the population. Optimization of the speech analysis engine to a population of speakers provides the best result for an unknown or random speaker. However, where sufficient information is available concerning the speech of a specified speaker, the speech analysis engine uses one or more adaptive techniques to evolve or modify to reduce errors between phonemes identified from the present speaker and those observed across a cross-section of a population speaking the same language as the present speaker.

Figure 6:
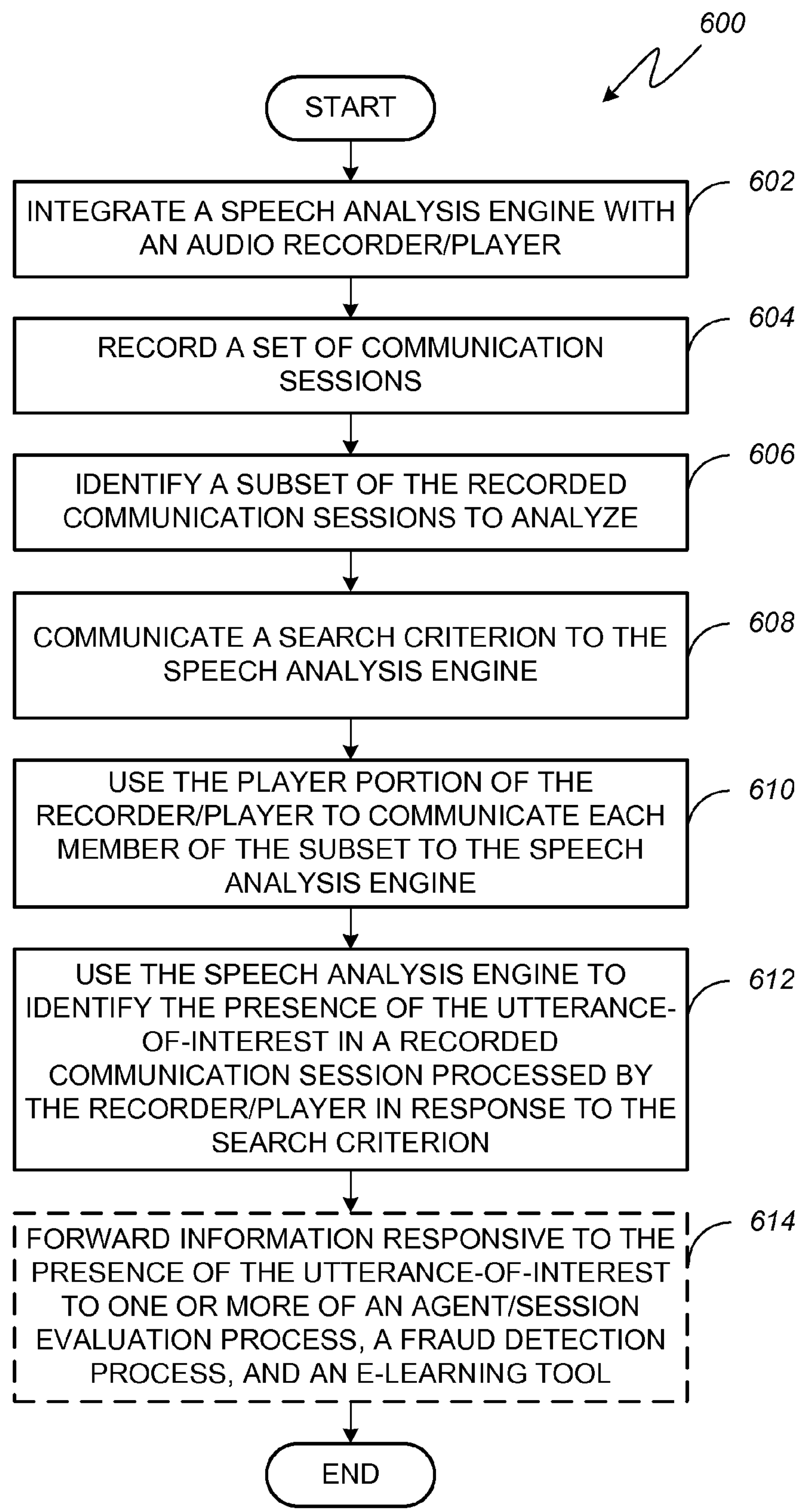
FIG. 6 is a flow diagram illustrating an embodiment of a method for analyzing a communication session.

FIG. 6 is a flow diagram illustrating an embodiment of a method 600 for analyzing a verbal communication. Method 600 begins with block 602 where a speech analysis engine is integrated or otherwise coupled to an audio player. Thereafter, in block 604, the player is used to record a set of communication sessions. In block 606, a subset of the set of communication sessions to analyze is identified. For example, a customer-center agent who wants to confirm that he offered each caller on a particular afternoon a product or service that was introduced earlier that morning may identify a subset of all recorded communication sessions that includes communication sessions in which the customer-center agent was a participant during the specific hours of interest.

In block 608, a search criterion is communicated to the speech analysis engine. The search criterion is responsive to an utterance-of-interest. For example, in the above-described scenario, the customer-center agent may want to know if he described the product or service as “new” or as having additional “features” in comparison with those previously available. Under these conditions, the customer-center agent communicates search criteria that identify which recorded communication sessions contain the utterances “new” and “features.” As described above, a search criterion can be verbally communicated or entered via any number of man-machine interfaces. When a spoken word or phrase is communicated as a search input, the communication is analyzed by the speech analysis engine. Any errors in output information generated by the speech analyzer are likely to be repeated when a recorded communication including the voice of the same speaker is played back and analyzed. Consequently, the speech analysis engine can be modified by adjusting one or more parameters until the output errors are reduced and/or removed. Otherwise, errors in the output information can be used to identify a likely match with an utterance-of-interest. This is especially true when the speaker entering the search criterion via spoken word is a speaker on the recorded communication.

Next, in block 610, the player portion of the recorder/player communicates each member of the subset of communication sessions to the speech analysis engine. The individual communication sessions can be temporarily buffered or received one at a time by the speech analysis engine. As indicated in block 612, the speech analysis engine identifies the presence (or the lack thereof) of the utterance-of-interest in each member of the subset of communication sessions processed by the player in response to the search criterion. As described above, the search criterion can be one or more phonemes, words; an exact phrase; concatenated phrases; words/phrases within a user controllable number of seconds of each other in a real-time playback of the recorded communication, etc. A list of synonyms can be applied automatically or as directed by a user to broaden the search if the exact word or phrase uttered is not known. An underlying dictionary and language rules can be applied to convert typed text input into phonetic strings. In addition, a phonetic representation of a word or phrase of interest can be entered to improve accuracy of detection and or to extend the scope of the speech analysis tool to include words or phrases such as product names that may not be covered by the dictionary presently used by the speech analysis engine.

In optional block 608, information responsive to the presence or likelihood of the presence of the select utterance-of-interest is forwarded to one or more of an agent/call evaluation process, a fraud detection process, and an electronic learning tool. This information is available and can be stored with other metadata identifying the communication session as soon as the analysis engine has completed its task. Accordingly, a customer-center agent or other interested party can begin confirming that the utterance-of-interest was made or otherwise reviewing the communication session before the speech analysis system 100 has completed processing each of the members of the subset of recorded communication sessions.

Speech analytics (i.e., the analysis of recorded speech or real-time speech) can be used to perform a variety of functions, such as automated communication session evaluation, scoring, quality monitoring, quality assessment and compliance/adherence. By way of example, speech analytics can be used to compare a recorded interaction to a script (e.g., a script that the agent was to use during the interaction). In other words, speech analytics can be used to measure how well agents adhere to scripts, identify which agents are “good” sales people and which ones need additional training. As such, speech analytics can be used to find agents who do not adhere to scripts. Yet in another example, speech analytics can measure script effectiveness, identify which scripts are effective and which are not, and find, for example, the section of a script that displeases or upsets customers (e.g., based on emotion detection). As another example, compliance with various policies can be determined. Such may be in the case of, for example, the collections industry where it is a highly regulated business and agents must abide by many rules. The speech analytics of the present disclosure may identify when agents are not adhering to their scripts and guidelines. This improves collection effectiveness and reduces corporate liability and risk.

In this regard, various types of recording components can be used to facilitate speech analytics. Specifically, such recording components can perform various functions such as receiving, capturing, intercepting and tapping of data. This can involve the use of active and/or passive recording techniques, as well as the recording of voice and/or screen data.

Speech analytics can be used in conjunction with such screen data (e.g., screen data captured from an agent's workstation/PC) for evaluation, scoring, analysis, adherence and compliance purposes, for example. Such integrated functionalities improve the effectiveness and efficiency of, for example, quality assurance programs. For example, the integrated function can help companies to locate appropriate communication sessions (and related screen interactions) for quality monitoring and evaluation. This type of "precision" monitoring improves the effectiveness and productivity of quality assurance programs.

Another function that can be performed involves fraud detection. In this regard, various mechanisms can be used to determine the identity of a particular speaker. In some embodiments, speech analytics can be used independently and/or in combination with other techniques for performing fraud detection. Specifically, some embodiments can involve identification of a speaker (e.g., a customer) and correlating this identification with other information to determine whether a fraudulent claim for example is being made. If such potential fraud is identified, some embodiments can provide an alert. For example, the speech analytics of the present disclosure may identify the emotions of callers. The identified emotions can be used in conjunction with identifying specific concepts to help companies spot either agents or callers/customers who are involved in fraudulent activities. Referring back to the collections example outlined above, by using emotion and concept detection, companies can identify which customers are attempting to mislead collectors into believing that they are going to pay. The earlier the company is aware of a problem account, the more recourse options they will have. Thus, the speech analytics of the present disclosure can function as an early warning system to reduce losses.

Additionally, included in this disclosure are embodiments of integrated workforce optimization platforms, as discussed in U.S. application Ser. No. 11/359,356, filed on Feb. 22, 2006, entitled "Systems and Methods for Workforce Optimization," Attorney Docket No 762301-1110, which is hereby incorporated by reference in its entirety. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; and/or (5) Analytics—deliver insights from customer interactions to drive business performance. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience.

The foregoing description has been presented for purposes of illustration and description. It is not intended to be exhaustive or to limit the scope of the claims to the precise forms disclosed. Modifications or variations are possible in light of the above teachings. The embodiments discussed, however, were chosen and described to enable one of ordinary skill to utilize various embodiments of the present systems and methods. All such modifications and variations are within the scope of the appended claims when interpreted in accordance with the breadth to which they are fairly and legally entitled.

What is claimed is:

1. A system for analyzing voice-based communication sessions, comprising:

a player configured to replay a recording of a communication session;

an analysis engine coupled to the player, the analysis engine configured to process a stored communication session to generate a result responsive to an utterance-of-interest in the stored communication session, wherein the analysis engine uses a language model specific to a speaker when an identity of the speaker is known;

a presentor coupled to the analysis engine and configured to present a representation of the result; and a storage device coupled to the analysis engine, the storage device configured to cache a representation of the result, wherein the representation of the result comprises an indication of a match of the utterance-of-interest in the stored communication session and an indication of a certainty that the match is an actual match of the utterance-of-interest.

2. The system of claim 1, wherein the representation further comprises one of a text file, a database entry, and an alternative format.

3. The system of claim 1, wherein the analysis engine is responsive to a configuration parameter that communicates a function of result accuracy and a processing rate.

4. The system of claim 1, wherein the presentor presents a visual representation of the location of the match in the stored communication session.

5. The system of claim 4, wherein the model is responsive to metadata concerning the stored communication session.

6. The system of claim 1, wherein the analysis engine is responsive to a spoken search criterion.

7. The system of claim 6, wherein the spoken search criterion is entered by a party whose voice is represented in the stored communication session.

8. The system of claim 1, wherein the analysis engine comprises one of a phonetic analyzer and a large vocabulary speech recognition analyzer.

9. The system of claim 1, further comprising:

an automated performance manager coupled to the analysis engine and configured to receive information responsive to an identified agent.

10. The system of claim 9, wherein the automated performance is configured to generate at least one agent quality score.

11. The system of claim 1, wherein the presentor presents a visual representation of each stored communication session that contains a match with the search criterion.

12. The system of claim 11, wherein the presentor presents a visual indicator having a characteristic that varies as a function of a confidence level in the match.

13. A method for enhancing an audio player, comprising:

integrating a speech analysis engine with the audio player;

verbally communicating a first search criterion to the speech analysis engine;

using the speech analysis engine to identify a recorded communication session in response to the first search criterion by processing a select communication session with the speech analysis engine to generate a result, wherein the speech analysis engine uses a language model specific to a speaker when an identity of the speaker is known;

using the speech analysis engine to cache a representation of the result, wherein the representation of the result comprises an indication of a match of the first search criterion in the select communication session and an indication of a certainty that the match is an actual match of the first search criterion; and translating the result into a visual representation.

14. The method of claim 13, wherein using the speech analysis engine receives a second search criterion via a non-voiced communication medium.

15. The method of claim 13, wherein translating the result into a visual representation comprises generating an icon having a characteristic that varies as a function of a confidence level in the match.

16. The method of claim 13, further comprising:

forwarding information responsive to the result and an identified agent to a performance manager.

17. A method for analyzing a communication session, comprising:

integrating a speech analysis engine with a recorder/player;

using the recorder/player to record a set of communication sessions;

identifying a subset of the set of communication sessions to analyze;

communicating a search criterion indicative of an utterance-of-interest to the speech analysis engine;

using the player portion of the recorder/player to communicate each member of the subset of communication sessions to the speech analysis engine;

using the speech analysis engine to identify a match of the utterance-of-interest in a member of the subset of communication sessions, wherein the speech analysis engine uses a language model specific to a speaker when an identity of the speaker is known; and using the speech analysis engine to cache a result, wherein the result comprises an indication of the match of the utterance-of-interest in the member of the subset of communication sessions and an indication of a certainty that the match is an actual match of the utterance-of-interest.

18. The method of claim 17, wherein the match of the utterance-of-interest is used as an input applied to an agent-evaluation process.

19. The method of claim 17, wherein the match of the utterance-of-interest is used as an input applied to a fraud-detection process.

20. The method of claim 19, wherein the fraud detection process generates an alert.

21. The method of claim 19, wherein the fraud detection process identifies a speaker.

22. The method of claim 17, wherein the match is used as an input applied to an e-learning tool.

* * * * *